United States Patent [19]
Yu et al.

[11] Patent Number: 6,135,018
[45] Date of Patent: Oct. 24, 2000

[54] FRUIT SQUEEZER

[75] Inventors: Yuan-Liang Yu, Yi-Lan Hsien; Chung-Pin Chiou, Kaohsiung, both of Taiwan

[73] Assignee: Tsann Kuen U.S.A. Inc., Pasadena, Calif.

[21] Appl. No.: 09/526,655

[22] Filed: Mar. 15, 2000

[51] Int. Cl.[7] .............................. A23N 1/00; A47J 19/02
[52] U.S. Cl. .............................. 99/504; 99/501; 99/503; 99/505; 99/508
[58] Field of Search ........................ 99/495, 501–508; 100/98 R, 208, 213

[56] References Cited

U.S. PATENT DOCUMENTS

| | | | |
|---|---|---|---|
| 1,661,374 | 3/1928 | Lacey | 99/507 |
| 1,861,426 | 5/1932 | Davis | 99/503 X |
| 1,888,528 | 11/1932 | Faulds | 99/505 |
| 1,957,346 | 5/1934 | Larson | 99/505 |
| 1,966,978 | 7/1934 | Estrada et al. | 99/504 |
| 2,008,899 | 7/1935 | Daum | 99/507 |
| 2,017,960 | 10/1935 | Faulds | 99/504 X |
| 2,057,727 | 10/1936 | Blum | 99/505 |
| 2,160,388 | 5/1939 | Morse | 99/503 X |
| 3,575,227 | 4/1971 | Blum | 99/505 |
| 4,125,064 | 11/1978 | Ackeret | 99/508 |
| 4,706,559 | 11/1987 | De Zarate | 99/504 |
| 4,961,374 | 10/1990 | Lee | 100/98 R |

*Primary Examiner*—Timothy Simone
*Attorney, Agent, or Firm*—Christensen O'Connor Johnson & Kindness PLLC

[57] ABSTRACT

A fruit squeezer includes a hollow base, a container mounted on the hollow base and having a top open end, a strainer disposed in the container, a reamer disposed rotatably in the strainer, a driving unit mounted in the base and having a driving shaft projecting upwardly therefrom and connected to the reamer, and a squeezing member having a pivotal end mounted pivotally on the container so as to be movable toward and away from the top open end of the container. The squeezing member further has a pressing end opposite to the pivotal end, and a squeezing portion disposed between the pivotal end and the pressing end. The squeezing portion is movable toward the reamer when the squeezing member moves downwardly toward the top open end of the container.

3 Claims, 6 Drawing Sheets

FRUIT SQUEEZER

BACKGROUND OF THE INVENTION

1. Field of the Invention

This invention relates to a fruit squeezer, more particularly to an electrical fruit squeezer.

2. Description of the Related Art

FIGS. 1 to 3 illustrate a conventional fruit squeezer 1. The fruit squeezer 1 includes an L-shaped supporting stand 11, a squeezing member 12, a hollow base 13, a container 14, a strainer 15, a reamer 16, and a driving unit 132.

The supporting stand 11 has a horizontal seat 111 and a post 112 which rises uprightly from one end of the horizontal seat 111 and which has a top end. A pivotal seat 113 projects upwardly from a top end face of the top end of the post 112, and has top and bottom ends, top and bottom flanges 114, 117 projecting outwardly and respectively from the top and bottom ends of the pivotal seat 113, and opposite recesses 115 formed between the top and bottom flanges 114, 117. An interfering member 116 is disposed in the horizontal seat 111.

The squeezing member 12 has a pivotal end 121 mounted pivotally on the pivotal seat 113, a pressing end 122 opposite to the pivotal end 121, and a squeezing portion 123 disposed between the pivotal end 121 and the pressing end 122. The pivotal end 121 of the squeezing member 12 has two opposite pivotal protrusions 124 which are received respectively in the recesses 115 of the pivotal seat 113 so that the squeezing member 12 is rotatable about the pivotal seat 113.

The hollow base 13 has a bottom wall 136, a half shell body 131 disposed above and connected to the bottom wall 136, a motor 132 mounted therein and having a driving shaft 133 projecting upwardly therefrom through the half shell body 131, two opposite horizontally extending tongues 135 projecting laterally and oppositely from two opposite sides of the shell body 131, and an annular recess 134 formed between the half shell body 131 and the bottom wall 136. The interfering member 116 is received in the annular recess 134 when the hollow base 13 is seated on the horizontal seat 111 of the supporting stand 11.

The container 14 has a bottom end 141, a top open end 148, a peripheral confining wall 142 projecting upwardly from the bottom end 141 to the top open end 148, a spout 144 projecting outwardly from the peripheral confining wall 142, and a handle 143 connected to one side of the peripheral confining wall 142 adjacent to the top open end 148 of the container 14. The container 14 further has a gradually decreasing cross-section tubular wall 145 that extends upwardly and inwardly from the bottom end 141 of the container 14. The tubular wall 145 has a top opening 146 adjacent to the top open end 148 of the container 14. The driving shaft 133 extends into and passes through the top opening 146 of the tubular wall 145 from the motor 132. Two opposite slots 147 are formed respectively in two opposite sides of the tubular wall 145. The opposite tongues 135 extend respectively into the slots 147 when the bottom end 141 of the container 14 is seated on the half shell body 131.

The strainer 15 is mounted on the top open end 148 of the container 14, and has a peripheral confining wall, a central opening 151, and a plurality of angularly disposed slits 152 formed in the peripheral confining wall.

The reamer 16 is mounted rotatably in the strainer 15, and has a bottom end, and a conical portion projecting upwardly from the bottom end of the reamer 16. A plurality of angularly disposed interfering tabs 161 extend through the central opening 151 of the strainer 15. A vertically extending tubular piece 162 is mounted in the reamer 16 for receiving and engaging the driving shaft 133.

When in use, a half piece of a fruit is mounted on the conical portion of the reamer 16. The squeezing member 12 is then moved downwardly toward the reamer 16 so that the squeezing portion 123 abuts tightly against the fruit. The motor 132 is actuated when the driving shaft 133 is pushed downwardly to turn the power on via a micro switch (not shown), thereby squeezing the fruit.

The aforementioned fruit squeezer has disadvantages in that the requirement of the supporting stand 11 for supporting the squeezing member 12 and the hollow base 13 results in an increase in manufacturing cost. Moreover, the L-shaped supporting stand 11 considerably increases the volume of the fruit squeezer, thereby further increasing the packaging, transport, storing, and molding costs.

SUMMARY OF THE INVENTION

Therefore, the object of the present invention is to provide a fruit squeezer that is capable of overcoming the aforementioned problems.

Accordingly, a fruit squeezer of this invention comprises: a hollow base; a container mounted on the hollow base and having a peripheral confining wall and a top open end; a strainer disposed in the container and mounted on the peripheral confining wall adjacent to the top open end of the container; a reamer disposed rotatably in the strainer and having a top apex; a driving unit mounted in the base below the strainer and having a rotatable driving shaft projecting upwardly therefrom through the base and the container into the strainer and connected to the reamer; and a turnable squeezing member disposed above and across the reamer and having a pivotal end mounted pivotally on the container adjacent to the top open end of the container so as to be movable toward and away from the top open end of the container, the squeezing member further having a pressing end opposite to the pivotal end, and a squeezing portion disposed between the pivotal end and the pressing end, the squeezing portion moving toward the top apex of the reamer when the squeezing member moves downwardly toward the top open end of the container.

BRIEF DESCRIPTION OF THE DRAWINGS

In drawings which illustrate an embodiment of the invention.

DETAILED DESCRIPTION OF THE PREFERRED EMBODIMENT

Figure 1:
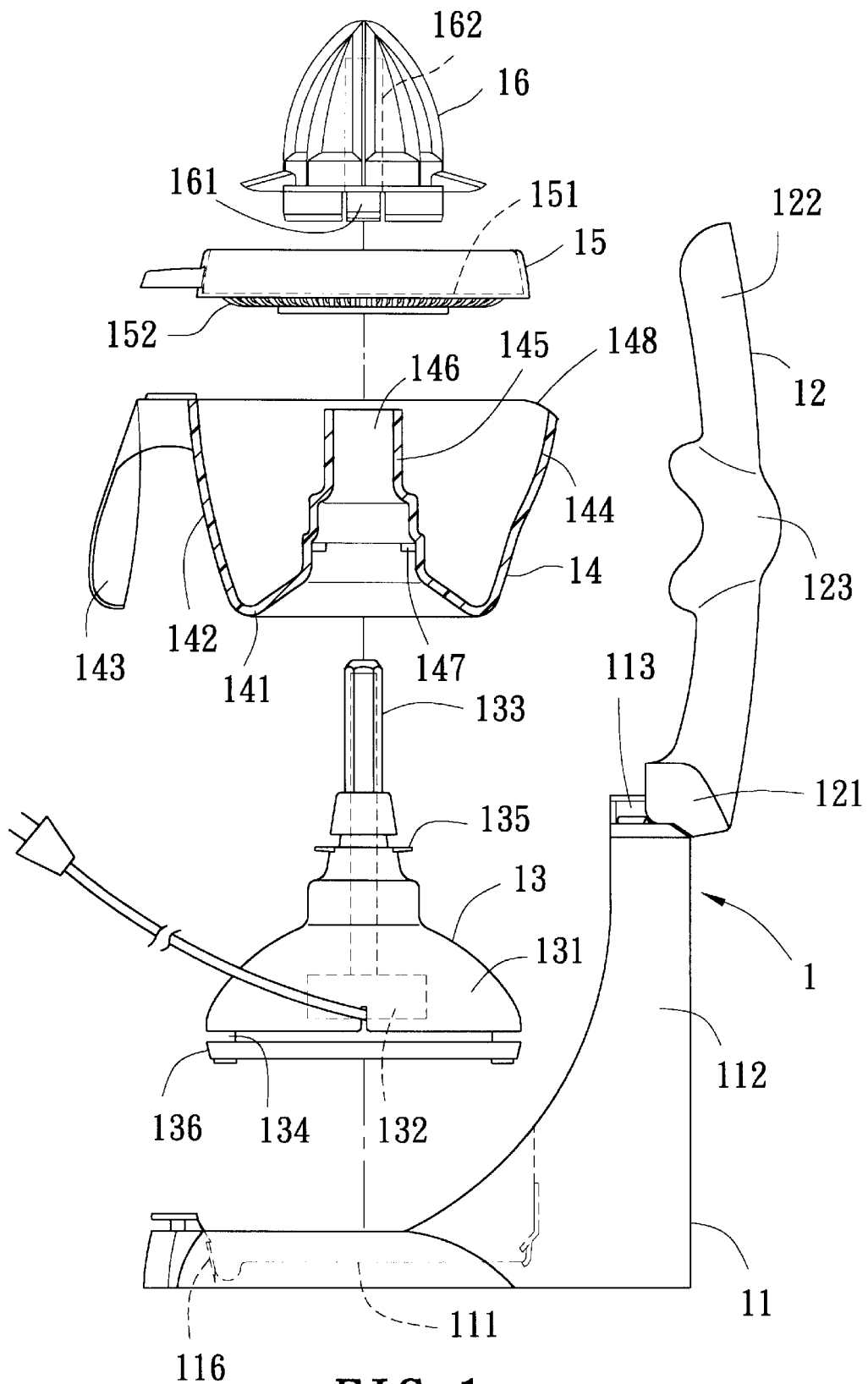
FIG. 1 is an exploded view of a conventional fruit squeezer.
Figure 2:
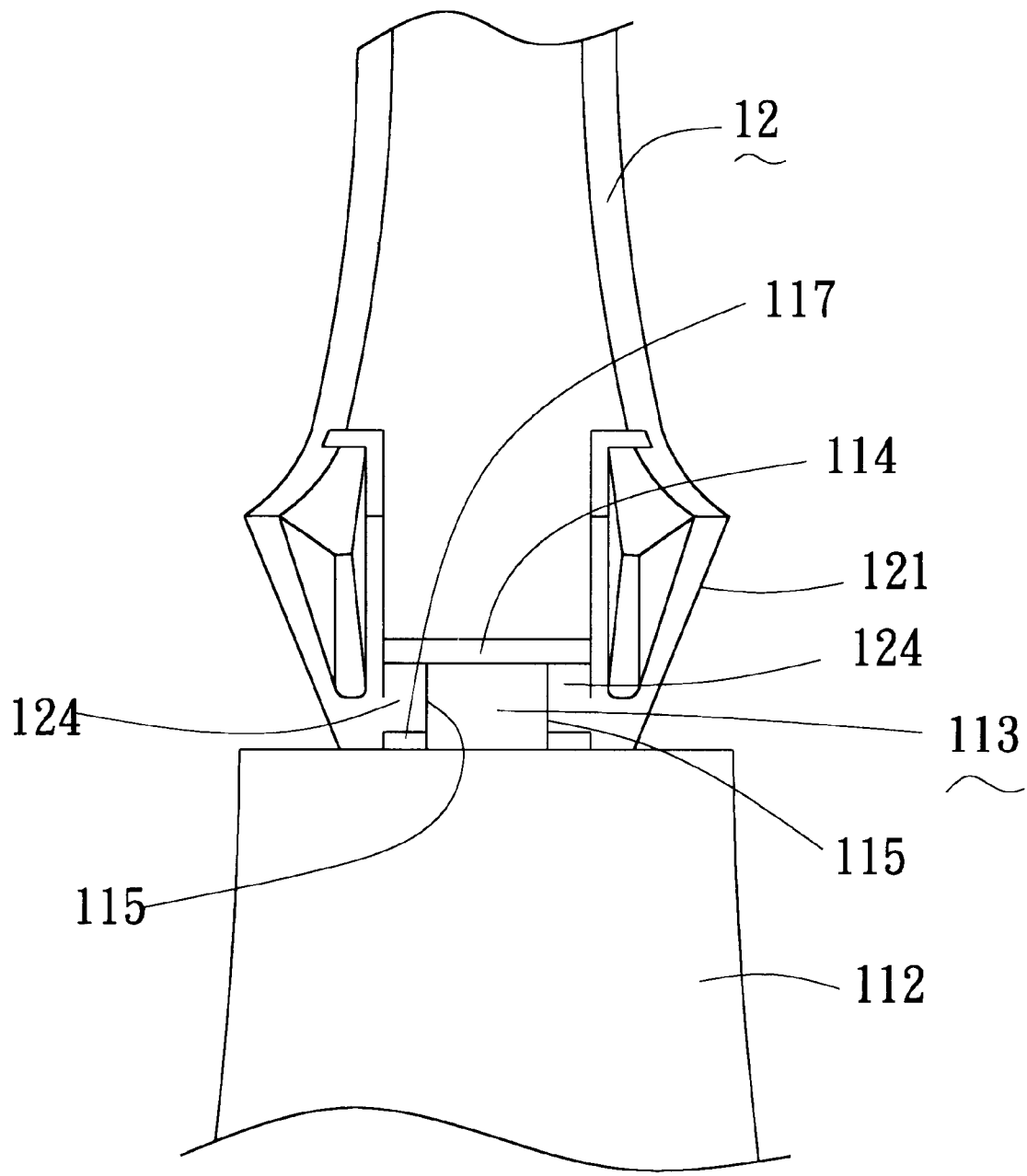
FIG. 2 is a fragmentary side view of the fruit squeezer of FIG. 1.
Figure 3:
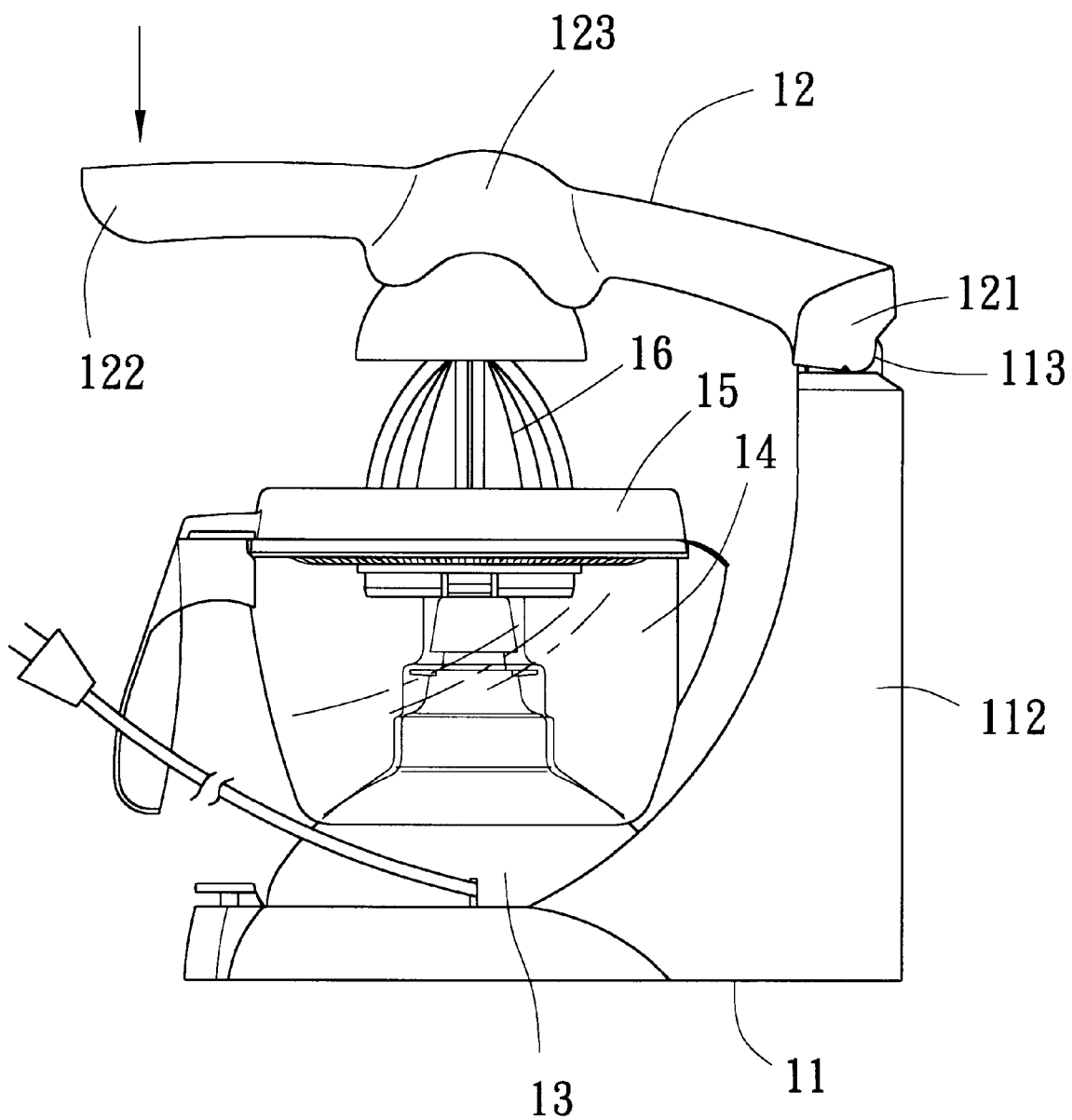
FIG. 3 is a schematic side view of the fruit squeezer of FIG. 1 in a state of use.
Figure 4:
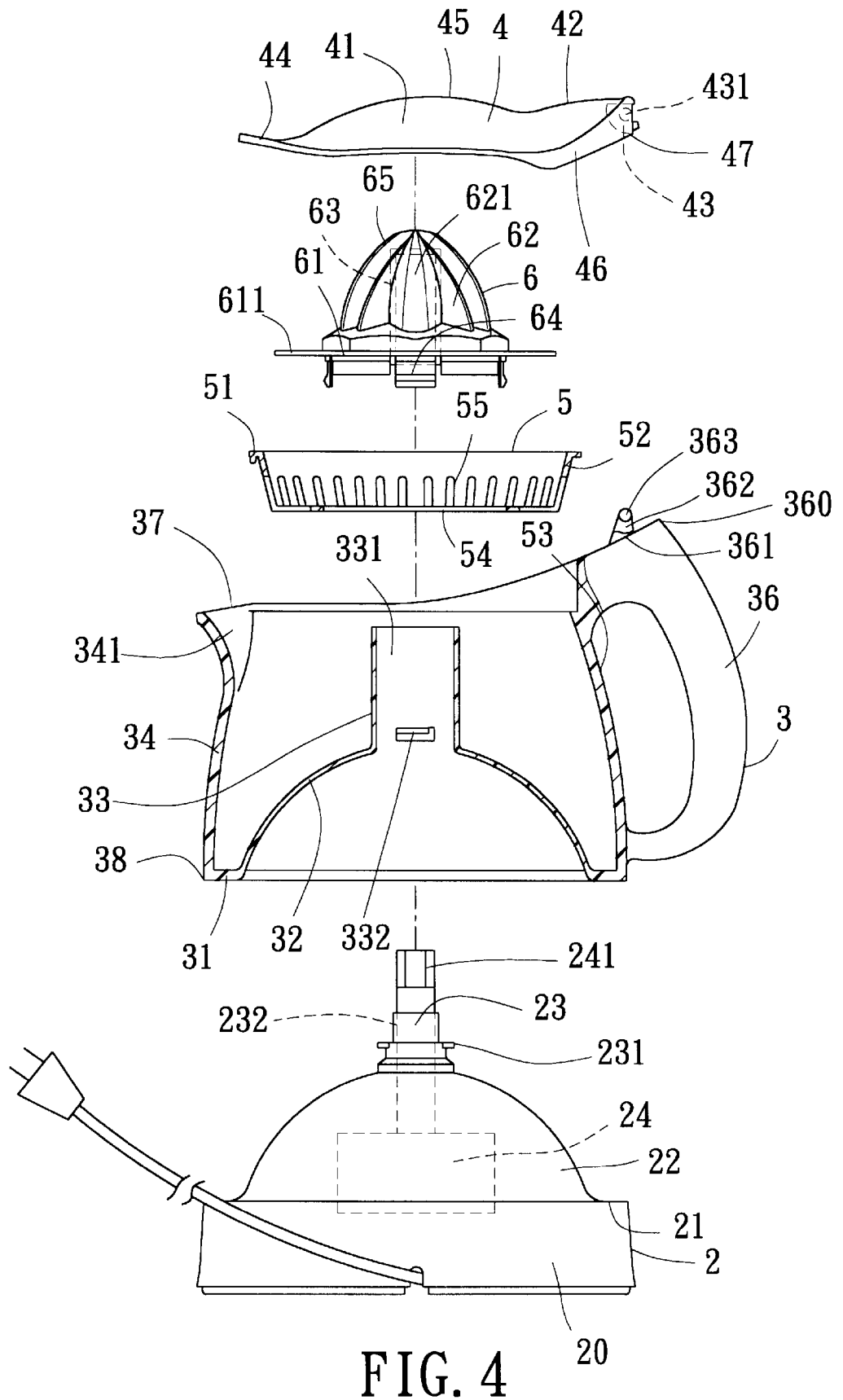
FIG. 4 is an exploded view of a fruit squeezer embodying this invention.
Figure 5:
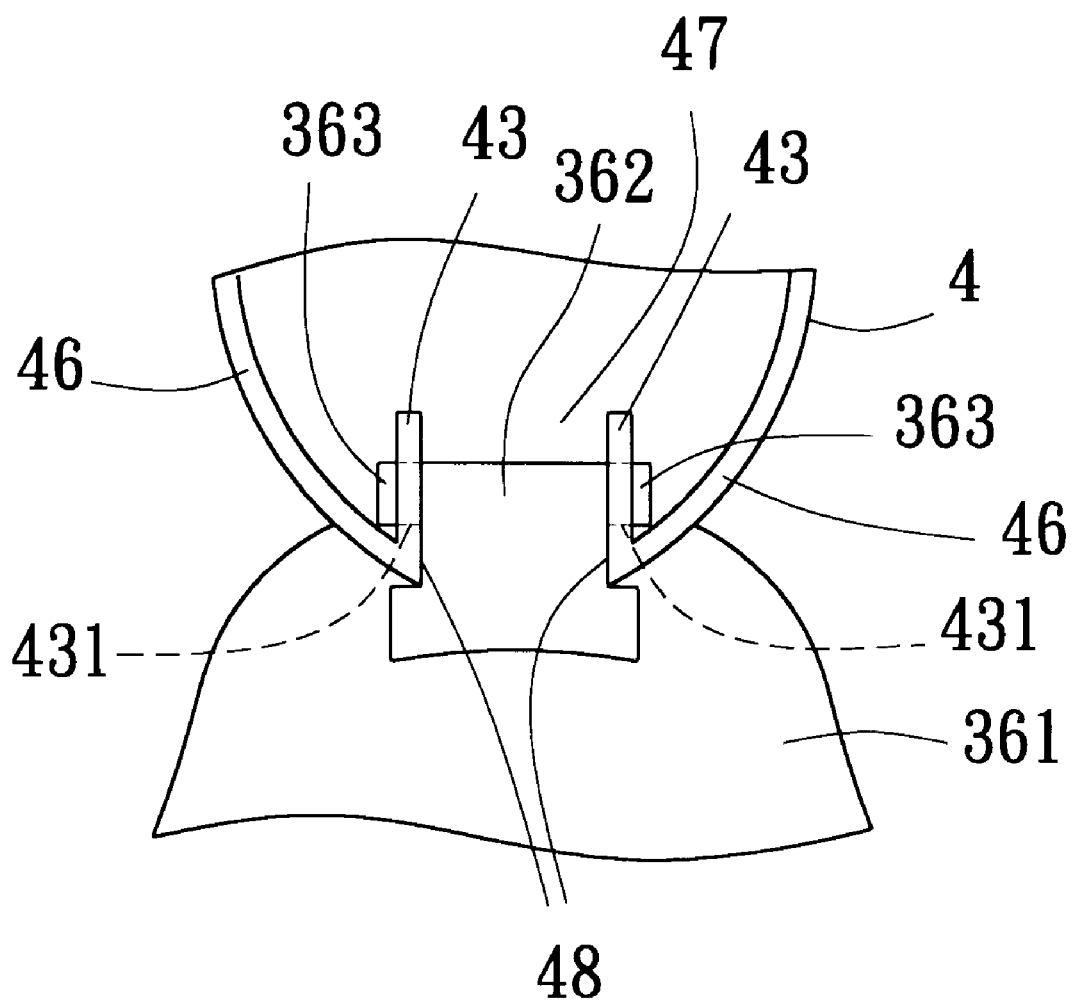
FIG. 5 is a fragmentary side view of the fruit squeezer of FIG. 4.
Figure 6:
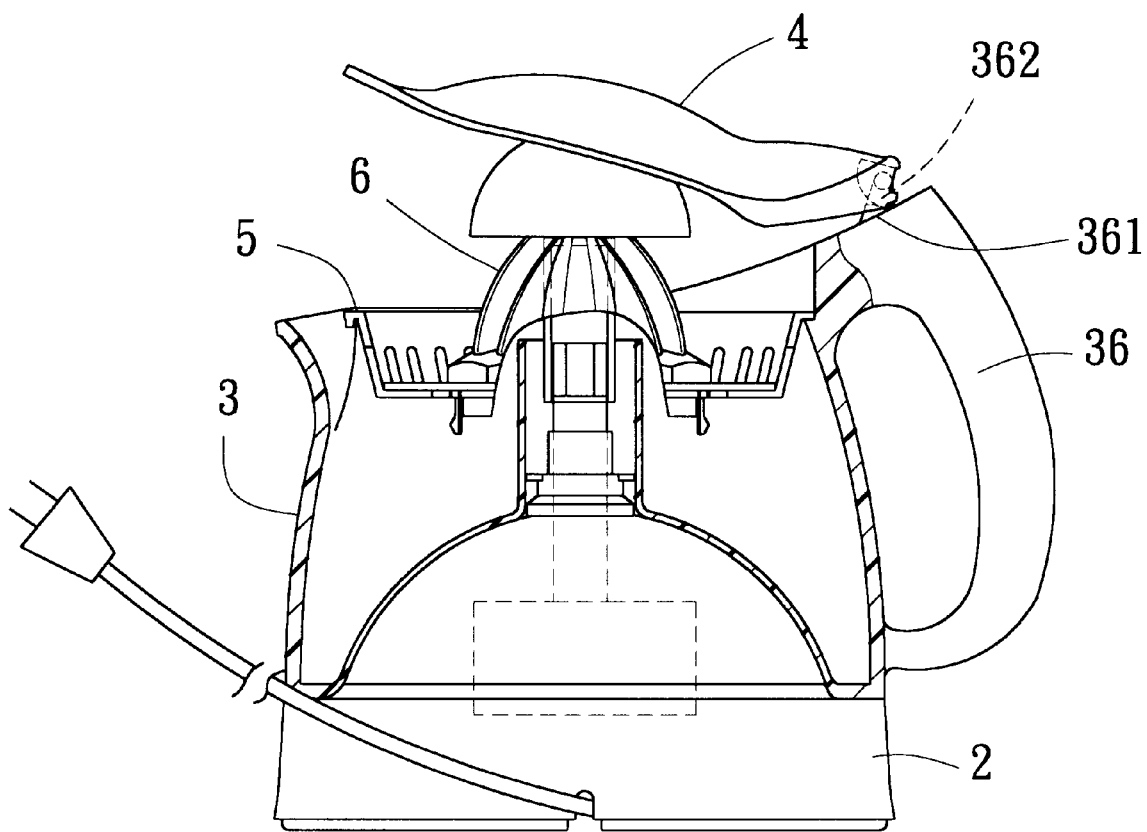
FIG. 6 is a partly cross-sectional side view of the fruit squeezer of FIG. 4.

FIGS. 4 to 5 illustrate a fruit squeezer embodying this invention. The fruit squeezer includes a hollow base 2, a container 31 a squeezing member 4, a strainer 5, and a reamer 6.

The hollow base 2 has a bottom end, a vertically extending annular wall 20 projecting upwardly from the bottom end, a horizontally extending annular flange 21 extending inwardly of and from the annular wall 20, a half shell body 22 projecting upwardly from the annular flange 21, and a tubular pillar 23 projecting upwardly from a top open end of the half shell body 22. The tubular pillar 23 defines a channel 232. Two opposite positioning tongues 231 project laterally and outwardly from the tubular pillar 23. A motor 24 is mounted in the hollow base 2, and has a driving shaft 241 extending therefrom into and through the channel 232 of the tubular pillar 23. The motor 24 is actuated to rotate the driving shaft 241 when the driving shaft 241 is pushed downwardly to turn the power on via a micro switch (not shown).

The container 3 has a top open end 37, a bottom end 38, a peripheral confining wall 34 projecting upwardly from the bottom end 38 to the top open end 37 of the container 3, a spout 341 projecting outwardly from one side of the peripheral confining wall 34 adjacent to the top open end 37 of the container 3, and a handle 36 projecting outwardly from the other side of the peripheral confining wall 34. The bottom end 38 of the container 3 has a flat annular bottom end face 31 extending laterally and inwardly of the container 3 from the peripheral confining wall 34. A curved wall 32 projects upwardly and inwardly of the container 3 from the annular bottom end face 31 for receiving the half shell body 22 of the hollow base 2 when the annular bottom end face 31 is seated on the annular flange 21 of the hollow base 2. A tubular wall 33 projects upwardly from a top open end of the curved wall 32, and defines a channel 331 that is aligned with the tubular pillar 23. Two opposite slots 332 are formed in two opposite sides of the tubular wall 33. The tubular pillar 23 extends into the channel 331 of the tubular wall 33 with the positioning tongues 231 extending respectively into the slots 332. The handle 36 has a top end 360 which projects laterally and upwardly from the top open end 37 of the container 3 and which has an inclined top end face 361. A pivotal seat 362 projects upwardly from the top end face 361 of the handle 36, and has a top end, two opposite sides, and two pivotal protrusions 363 projecting oppositely and respectively from the opposite sides of the pivotal seat 362 adjacent to the top end of the pivotal seat 362.

The strainer 5 has a top open end, a bottom end, a surrounding wall 52 projecting upwardly from the bottom end to the top open end of the strainer 5, and an annular flange lip 51 projecting outwardly and laterally from the top open end of the strainer 5 for seating on the top open end 37 of the container 3. The bottom end of the strainer 5 has an annular bottom end face 53 projecting laterally and inwardly of the strainer 5 from the surrounding wall 52, and a bottom opening 54 surrounded by the annular bottom end face 53 and aligned with the tubular wall 33 of the container 3. A plurality of angularly disposed slits 55 are formed in the surrounding wall 52 and extend radially into the annular bottom end face 53 of the strainer 5.

The reamer 6 is disposed rotatably in the strainer 5, and has an annular skirt 61, two opposite limiting tabs 611 projecting outwardly and laterally from the annular skirt 61 for limiting lateral movement of the reamer 6, a hollow conical portion 62 projecting upwardly from the annular skirt 61, and a plurality of angularly disposed interfering tabs 64 projecting downwardly from the annular skirt 61 and extending through the bottom opening 54 of the strainer 5 for limiting axial movement of the reamer 6. A vertically extending tubular driven piece 63 is disposed in and is connected to the reamer 6, and is aligned with the driving shaft 241. The driving shaft 241 extends through the container 3 and into the strainer 5 and is connected to the tubular driven piece 63 for rotating the conical portion 62 of the reamer 6. The conical portion 62 of the reamer 6 has a top apex 65, and a plurality of angularly disposed and spaced apart ridged blades 621 projecting outwardly and radially therefrom and extending upwardly from the annular skirt 61 toward one another at the top apex 65 of the reamer 6.

The squeezing member 4 is substantially disk-shaped, and is disposed above and across the reamer 6. The squeezing member 4 has a pivotal end 42 which is mounted pivotally on the pivotal seat 362 of the handle 3 so as to be movable toward and away from the top open end 37 of the container 3. The squeezing member 4 further has a pressing end 44 opposite to the pivotal end 42, and a squeezing portion 41 disposed between the pivotal end 42 and the pressing end 44. The squeezing member 4 includes a top wall 45 extending from the pivotal end 42 to the pressing end 44, and a pair of rims 46 projecting laterally and downwardly from two opposite sides of the top wall 45, respectively, and extending along directions from the pivotal end 42 toward the pressing end 44. The rims 46 extend toward one another and confine a gap 47 at the pivotal end 42, and further extend away from one another to locations remote from the pivotal end 42. The rims 46 form respectively two opposite end edges 48 to confine the gap 47. A pair of parallel lugs 43 project laterally and respectively from the end edges 48 of the rims 46 below the top wall 45 in a direction from the pivotal end 42 toward the pressing end 44 of the squeezing member 4, and extend between the rims 46. The lugs 43 are connected respectively and integrally to the end edges 48 of the rims 46, and are spaced apart from the top wall 45. A pair of through-holes 431 are formed respectively in the lugs 43 for receiving respectively the pivotal protrusions 363 of the pivotal seat 362 so that the squeezing member 4 is rotatable about the pivotal protrusions 363 of the pivotal seat 362.

When in use, a half piece of a fruit is mounted on the top apex 65 of the conical portion 62 of the reamer 6. The squeezing member 4 is then moved downwardly toward the reamer 6 so that the squeezing portion 41 abuts tightly against the fruit. The motor 24 is actuated to drive the driving shaft 241 when the driving shaft 241 is pushed downwardly to turn the power on via the micro switch (not shown), thereby squeezing the fruit.

The aforesaid fruit squeezer of this invention is advantageous over the aforementioned conventional fruit squeezer in that it dispenses with the supporting stand 11 required in the conventional fruit squeezer. Since the squeezing member 4 is mounted on the handle 36 of the container 3 instead of being mounted on the aforesaid supporting stand 11, the length from the pivotal seat 362 to the reamer 6 for the squeezing member 4 is shorter than the length from the pivotal seat 113 to the reamer 16 of the conventional fruit squeezer. The squeezing member 4 is thus capable of having a length shorter than that of the squeezing member 12 of the conventional fruit squeezer.

With the invention thus explained, it is apparent that various modifications and variations can be made without departing from the spirit of the present invention. It is therefore intended that the invention be limited only as recited in the appended claims.

We claim:

1. A fruit squeezer, comprising:

a hollow base;

a container mounted on said hollow base and having a peripheral confining wall and a top open end;

a strainer disposed in said container and mounted on said peripheral confining wall adjacent to said top open end of said container;

a reamer disposed rotatably in said strainer and having a top apex;

a driving unit mounted in said base below said strainer and having a rotatable driving shaft projecting upwardly therefrom through said hollow base and said container into said strainer and connected to said reamer; and a turnable squeezing member disposed above and across said reamer and having a pivotal end mounted pivotally on said container adjacent to said top open end of said container so as to be movable toward and away from said top open end of said container, said squeezing member further having a pressing end opposite to said pivotal end, and a squeezing portion disposed between said pivotal end and said pressing end, said squeezing portion moving toward said top apex of said reamer when said squeezing member moves downwardly toward said top open end of said container.

2. The fruit squeezer of claim 1, wherein said squeezing member includes a top wall extending from said pivotal end to said pressing end, and a pair of rims projecting laterally and downwardly from two opposite sides of said top wall, respectively, and extending along directions from said pivotal end toward said pressing end of said squeezing member, said rims extending toward one another and confining a gap at said pivotal end and further extending away from one another to locations remote from said pivotal end, said rims forming respectively two opposite end edges to confine said gap, said squeezing member further having a pair of parallel lugs which project laterally and respectively from said end edges of said rims below said top wall in a direction from said pivotal end toward said pressing end and extending between said rims, said lugs being connected respectively and integrally to said end edges of said rims and being spaced apart from said top wall, said lugs having through-holes formed respectively therein.

3. The fruit squeezer of claim 2, wherein said container has a handle projecting outwardly from one side of said peripheral confining wall, said handle having a top end projecting laterally and upwardly from said top open end of said container and having a top end face, said top end face of said handle having a pivotal seat projecting upwardly therefrom and inserted between said lugs, said pivotal seat having two opposite sides in contact with said lugs at said gap, and two pivotal protrusions disposed above said gap and projecting oppositely and respectively from said two opposite sides of said pivotal seat and extending respectively through said through-holes.

* * * * *